United States Patent [19]
Shaw

[11] Patent Number: 5,226,376
[45] Date of Patent: Jul. 13, 1993

[54] MACHINE FOR LAYING AGRICULTURAL PLASTIC FILM

[76] Inventor: Ellsworth Shaw, 3602 East Flower, Tucson, Ariz. 85716

[21] Appl. No.: 782,656

[22] Filed: Oct. 25, 1991

[51] Int. Cl.$^5$ .............................................. A01C 5/00
[52] U.S. Cl. .................................................. 111/144
[58] Field of Search ............... 111/102, 144, 145, 146; 47/9 M

[56] References Cited
U.S. PATENT DOCUMENTS

| | | | |
|---|---|---|---|
| 1,787,902 | 1/1931 | Herfort | 47/9 M |
| 2,890,665 | 6/1959 | Kang | 111/102 |
| 3,315,623 | 4/1967 | Tschudy, Jr. | 47/9 X |
| 3,468,267 | 9/1969 | Morris et al. | 111/144 X |
| 3,559,599 | 2/1971 | Hoadley | 111/102 X |
| 3,945,330 | 3/1976 | Leavitt et al. | 47/9 X |
| 4,092,936 | 6/1978 | Griffin et al. | 111/102 X |
| 4,117,787 | 10/1978 | Pavan | 47/9 X |
| 4,285,161 | 8/1981 | Kawasaki et al. | 111/102 X |
| 4,888,913 | 12/1989 | Hoeft | 47/9 |
| 4,953,482 | 9/1990 | Emily | 111/144 |

FOREIGN PATENT DOCUMENTS 0172077  2/1986  European Pat. Off. ............ 47/9 M Primary Examiner—David H. Corbin
Assistant Examiner—Spencer Warnick
Attorney, Agent, or Firm—J. Michael McClanahan

[57] ABSTRACT

An improvement in machines for laying agricultural plastic film is disclosed which provides means forcing the plastic film against the seed bed and inclined sides and bottom of oppositely situated furrows utilizing a forced air fan to blow air downwardly upon the plastic film to secure it in place against disturbing forces, such as winds, in order that the longitudinal side edges of the plastic sheet may be properly covered with a layer of soil thrown up by rearwardly located covering discs. In an alternate embodiment, a fluid, such as air or water, is forcibly directed against the plastic film overlying the inclined side and bottom of the oppositely situated furrows to hold the film in place for covering by soil thrown up by the covering discs.

21 Claims, 2 Drawing Sheets

MACHINE FOR LAYING AGRICULTURAL PLASTIC FILM

BACKGROUND OF THE INVENTION

1. Field of the Invention

The field of the invention is machines used in agriculture which lay down plastic films covering seed beds of soil under which are planted agricultural crops with the stems of the crop protruding upward through openings in the plastic film.

2. Description of the Related Art

In agriculture, it has become common practice to place a thin flexible plastic film or sheet on the ground overlaying elongated seed beds wherein the planted crop has its stems protruding through an opening in the plastic. With this practice, the ground surrounding the base of the plant stem from which the roots grow is covered with the plastic sheet. The plastic sheet may be opaque, thereby denying sunlight to surrounding weeds so that they will not flourish, or the plastic may be clear, in which case the weeds cannot push up through the plastic and wither and die. In addition, a further advantage of laying plastic sheets over crop plants is that water evaporation from the soil is prevented, leaving the water entrapped in the soil for the benefit of the plant itself.

Now tractor pulled machines have been devised and are in common use laying an elongated plastic sheet or film upon long rows of seed beds. These seed beds are formed by furrows cut in the soil on either side of the seed bed, which provide conduits for irrigation water. The common practice in laying down the plastic film on the seed bed is to play it out from a roll with the longitudinal side edges of the film extending down into the oppositely situated furrows and momentarily held there by rolling wheels (hold down wheels) pressing down upon the plastic film. Immediately behind each pressing wheel is a covering disc which takes soil from the furrow and throws it upon the longitudinal side edges of the plastic sheet. This soil thrown up and onto the sides of the plastic sheet anchor it in place. It is anticipated that the plastic film will reside over the seed bed for a considerable period of time, hopefully until the crop is harvested.

It is obvious from the above description that the plastic film needs to be as wide as a seed bed plus the slanted side of each furrow on each side of the seed bed and the trough of the furrow. Now since water is directed to the crops by irrigation methods of running the water into the furrows, the sheet of plastic may be no wider than a seed bed (together with 1 side wall and bottom of each oppositely situated furrow) unless measures are taken to cut the plastic sheet at the bottom of the furrow, or to make perforations through it at that point. It is necessary for the irrigation water in the furrow to seep into the ground and if the plastic sheet is continuous in lining the furrow, no water will penetrate. In many cases, the plastic sheet may be from 2 to 4 or 5 feet in width depending upon the seed bed. The seed beds may vary in length from a few hundred feet to thousands of feet so it is obvious that rather large rolls of plastic film are utilized.

A number of United States patents have been issued pertaining to tractor pulled devices applying and securing a plastic film onto a seed bed, for example, Emily in U.S. Pat. No. 4,953,482 discloses a film laying machine which accomplishes the purposes outlined above and, in addition, includes a cutter which severs the plastic film at the end of a row. Further, the machine provides means for covering the severed ends. Hoeft in U.S. Pat. No. 4,888,913 similarly describes a plastic film laying machine employing a transmission system with a variable speed drive in order to accommodate the different tension forces exerted on the plastic film when it is laid across uneven seed beds. Pavan in U.S. Pat. No. 4,117,787 similarly discloses such a film laying machine wherein the machine perforates the plastic sheet for plant locations prior to laying the sheet upon the ground. Leavitt in U.S. Pat. No. 3,945,330 also provides a plastic film laying machine wherein a transmission synchronizes perforations in the film to align with seeds deposited in the ground.

Lastly, in two earlier patents, namely U.S. Pat. Nos. 3,468,267 to Morris and 3,315,623 to Tschudy, early models of plastic film laying machines are shown and described, incorporating the method of operation initially discussed.

All of the above machines appear to perform their functions satisfactorily, however, it has been the inventor's experience that present available film laying machines suffer from shortcomings in that in the presence of winds having speeds above minimal levels, the wind picks up the plastic film before it can be held down by the pressing wheels or the wind may even pick it up before it can be covered with soil by the closing discs along the longitudinal side edges of the plastic film. As a consequence, the inventor has experienced many occasions where plastic film laying must come to a halt because of blowing winds, resuming only after the winds have died down or ceased. With present film laying machines, winds over 5 to 7 mph appear to adversely affect operations.

In an effort to somewhat counter the effects of winds, the manufacturers of the film laying machines recommend utilizing plastic sheet with increased thickness so as to make the sheet less susceptible to disturbing winds.

The use of spring-laden or floating, hold-down wheels under some circumstances is satisfactory and sufficient for retaining the plastic film on the bed until covering discs secure it. However, soil preparation (clods of soil) and irregularities of the beds often change bed contour and result in abnormal stresses on the plastic film as a consequence of constant and specific points of pressure caused by hold-down wheels. The wheels tend to bounce and their bouncing increases with speed and irregularities that often have to be compensated by reduced speed or an additional operator.

It is thus readily apparent that there is need for improvements to film laying machines which allow the machines to continue working in spite of and even during the winds and/or abnormal soil and bed preparation conditions. Also obviously, it would be of great advantage if improvements to the present available plastic film laying machines were available such that thinner (and obviously much cheaper) plastic films could be utilized at higher speeds.

SUMMARY OF THE INVENTION

The embodiment of the invention described consists of improvements to tractor pulled film laying machines used in agriculture to cover elongated seed beds where the film is secured over the seed bed by throwing up soil upon the longitudinal side edges of the plastic film so as to anchor the plastic film to the ground and this operation carried on at speeds higher than previously possible. The improvements described provide a means and method of compelling the plastic film to lie firmly against the seed bed as well as the inclined sides and bottom of the oppositely situated furrows in order to protect against disturbing forces which may interrupt the proper positioning of the plastic film so that the soil thrown up along the longitudinal side edges will in fact cover the edges so that they may be securely anchored. These disrupting forces generally take the form of winds which lift the plastic film from the seed bed and inclined sides of oppositely situated furrows prior to being covered so that the edges are not covered at all when the covering disc throws up soil.

More particularly, the embodiment of the invention consists of means to propel a fluid, such as air or water, or a mixture of air and water, against the plastic sheet so as to urge it against the seed bed and inclined sides and bottom of opposite furrows to hold it in place for the covering operation.

The preferred embodiment places a propeller type fan immediately over the plastic film just as it engages the soil bed after being unrolled from the roll of plastic sheet. The propeller blades are so pitched as to push air downward toward the ground, the propeller residing a foot or so off the ground. The air driven down upon the plastic film will spread after it hits the film, following the contour of the plastic film, forcing it to conform to the seed bed such that the film is held in place against the seed bed and inclined side walls and bottom of the oppositely situated furrows and against winds which may tend to attempt to disturb the positioning of the plastic film. With the plastic film firmly in place, the covering disc throws up soil from the furrow onto the film to anchor the longitudinal side edges.

The propeller-like fan may be driven by an independent engine, such as a gasoline engine mounted immediately above the central axis of the propeller or, utilizing the tractor's take off mechanism, may be a hydraulic motor. With the availability of electricity from the tractor pulling the film laying machine, an electrical motor could also be utilized.

In an alternate embodiment of the device, a fluid, such as air or water, may be specifically directed against the plastic film in proximity of the included sides of oppositely situated furrows. The fast moving air is provided through ducts emanating from a container enclosing a pumping system which also is driven by an independent power source such as a gasoline engine or the like. In this alternate embodiment, a lessened volume of moving fluid is required as the fluid is directed through at least two ducts in the proximity of the edges of the plastic film. By such means, disturbing winds are prevented from catching the sides of the plastic sheet and lifting them up. While the plastic sheet is held in place by the fluid exiting the ducts, the covering disc throws up soil over the longitudinal side edges of the plastic film.

It is noted that while a fluid such as air or water has been discussed, certainly the invention may include other fluids which may be useful, such as a pesticide, or maybe an air and water mixture. It would be entirely possible also to use directed water jet sprays from a contained pressurized system aimed to impact the side edges of the plastic film to hold it in place for the covering operation.

Further, although the above discussion assumes a steady flow of fluid, it is likewise apparent that intermittent blasts of fluid may also be employed. In addition, varying the speed of the propelling means to effect the speed and volume of fluid delivered may be used to secure the plastic sheet in place against disturbing forces. Further, more than one propelling means may be employed.

Accordingly, it is an object of the subject invention to provide means and method for securing plastic film in place over the seed bed and inclined sides and bottom of opposite furrows so as to allow the side edges of the plastic film to be covered by soil thrown up by a covering disc.

It is another object of the subject invention to provide means and method to forcibly to secure the plastic film in place against possible disturbances, such as wind, when laying down plastic film during the operation of securing the film to the soil over a seed bed.

It is still another object of the subject invention to provide improvements to a film laying machine wherein different means and methods are utilized to force the film to conform to the seed bed and sides of the oppositely situated furrows in the presence of disturbing forces.

Lastly, it is still another object of the subject invention to provide means and method of laying plastic film over agricultural seed beds whereby thinner and less expensive plastic film is utilized over that previously used.

Other objects of the invention will in part be obvious and will in part appear hereinafter. The invention accordingly comprises the apparatus and method comprising construction, combination of elements, and arrangement of parts which are exemplified in the following detailed disclosure and the scope of the application which will be indicated in the claims.

BRIEF DESCRIPTION OF THE DRAWINGS

For further understanding of the nature and objects of the present invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
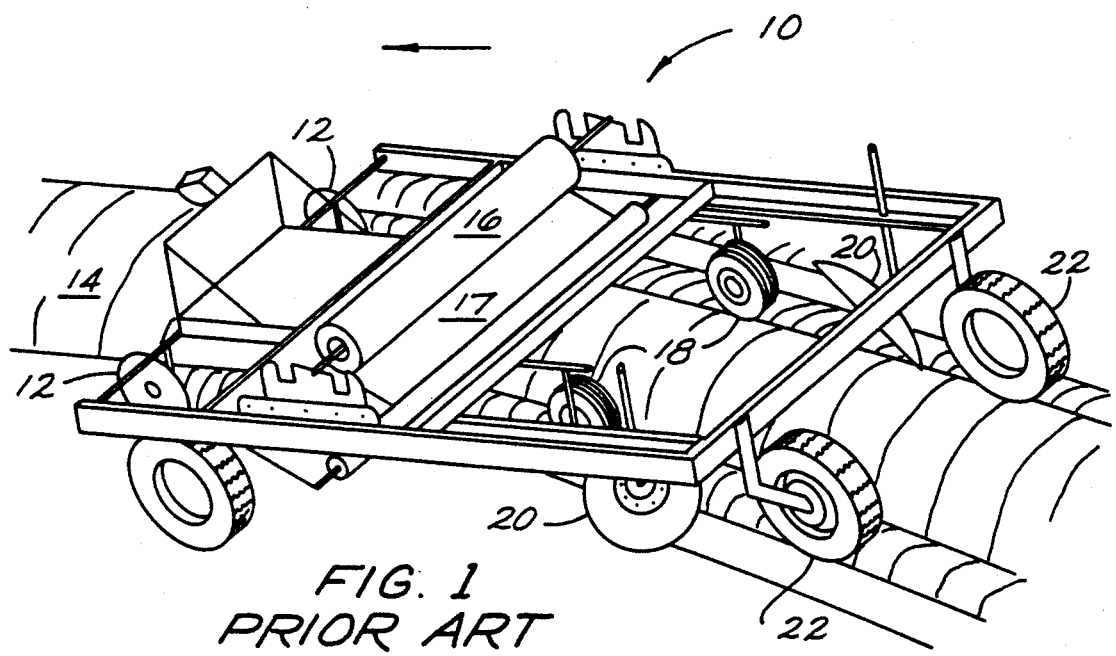
FIG. 1 is a perspective view of prior art film laying machines used for agricultural purposes.

FIG. 1 shows a typical prior art tractor pulled plastic film laying machine 10. Here, furrows prepared by forward opening discs or ploughshares 12 prepare the seed bed of soil 14 over which is laid the plastic sheet film 17 unrolling off plastic roll 16. As laying machine 10 moves forward from right to left, the plastic film, which may be 4 or more feet wide, is held in the bottom of the furrows by floating press (hold down) wheels 18 which engage the top surface of the plastic film and press it against the soil as they rotate when the machine moves forward. Lastly, the closing discs 20 throw soil up and upon the longitudinal side edges of the plastic film to anchor the plastic film on both sides as the machine moves on.

As is readily seen in FIG. 1, the prior art plastic film laying machine 10 comprises a frame rolling on four wheels, a pair at the front and a pair at the rear. The bottom of the furrow also contains the longitudinal side edges of the plastic film plus the soil thrown up by closing disc 20. In most machines of this type, a seat is mounted at the rear of the device, fastened to the structural cross member of the frame to which the wheels are attached. The purpose of the seat is to allow an operator to observe the laying of the film to assure that the longitudinal side edges are being correctly anchored by the thrown up soil. The laying machine is generally pulled by a tractor or other prime mover.

The typical plastic film laying machine shown in FIG. 1 generally operates satisfactorily under ideal conditions. Ideal conditions include conditions of no wind or wind of not more than a few miles per hour. However, experience has shown that with typical plastic film laying machines, wind or wind gusts of 5 to 7 mph or more so completely interfere with the operation that the operator is compelled to terminate laying film until the wind dies down. The wind catches the film as it comes off the plastic roll and moves it around such that it will not be in the furrow in position for the floating press wheels 18 to hold down and therefore the longitudinal side edge will not be covered with soil by the closing discs 20.

Figure 2:
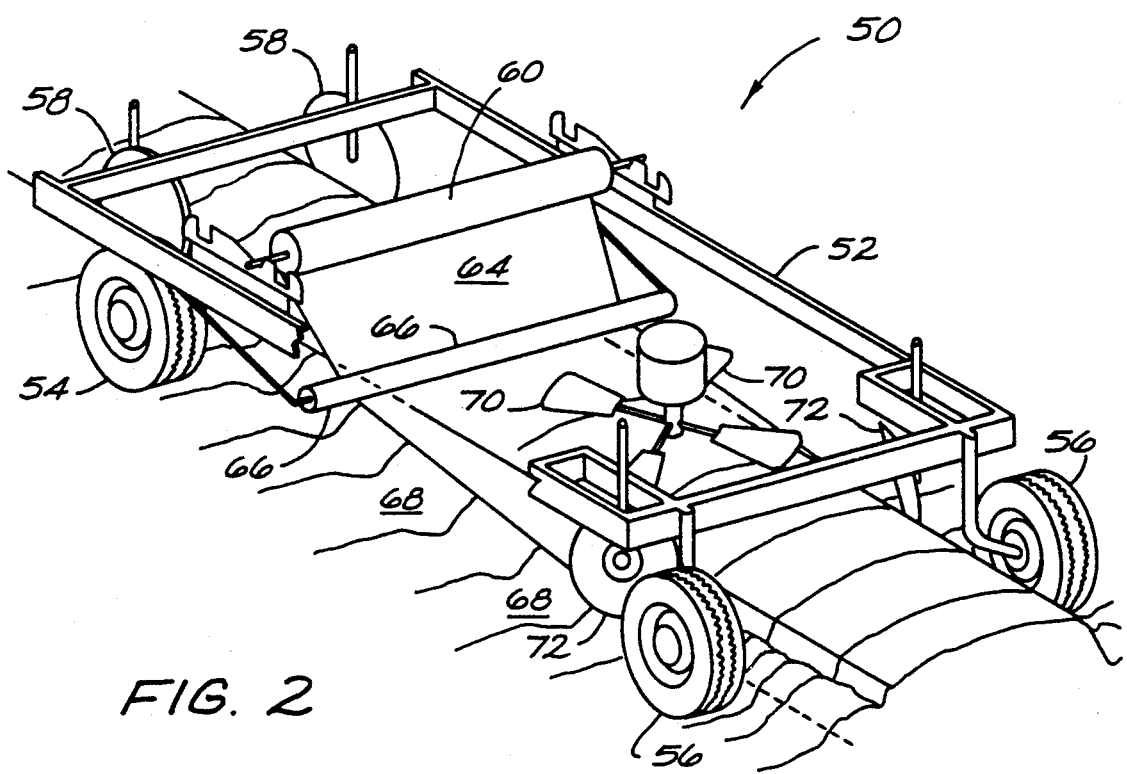
FIG. 2 is a perspective view of the preferred embodiment of the invention providing a means and method to secure the plastic film to the soil bed and inclined sides of oppositely situated furrows against disturbing forces to permit covering of the longitudinal side edges with anchoring soil.

The embodiment of the invention is shown in a perspective view in FIG. 2 depicting the inventive means of securing the plastic against the prepared seed bed of soil and against the inclined sides and trough of the formed furrow until the closing discs can throw soil on the longitudinal side edges of the plastic film. More particularly, plastic film laying machine 50 is shown incorporating the usual rectangular structural frame 52 to which are attached forward wheels 54 and rear wheels 56. Immediately forward of front wheels 54 are opening discs 58 which prepare the furrows, throwing soil up to form the seed bed for planting seed. Rearward of opening discs 58 and mounted upon structural frame 52 is a roll of plastic film 60 which contains the sheet plastic to be laid upon seed bed 62 as machine 50 passes over it. Plastic film 64 unrolling from roll 60 is initially held near to the top of bed of soil 62 by weighted roller 66.

Next to the embodiment of the invention which is the means by which the plastic film is pressed down and held upon the prepared seed bed 62 and against the inclined side and bottom of the trough of furrow 68 formed by opening disc 58, namely fluid forcing or propelling means 70, shown here as a circular fan 70. With the pitch of the blades of fan 70 so angled as to force air downward, the effects of a disturbing wind attempting to lift the longitudinal side edges of the plastic film are overcome in that the downward pressure placed upon film 64 by air from fan 70 is greater than those forces exerted by the disrupting wind. As the plastic laying machine 50 of FIG. 2 is drawn forward (to the left), film 64 is held down in furrow 68 so that plastic film 64 is always in place to receive the securing dirt thrown on its longitudinal side edges by closing disc 72.

Like the prior art machines, plastic film laying machine 50 of FIG. 2 is drawn by a tractor or, if desired, the machine may be self-propelling.

Not shown in FIG. 2 is the manner by which fan 70 is rotated. It is anticipated that an independent gasoline motor may be employed, the motor secured to opposite sides of rectangular structural frame 52. The fan is then attached to the crankshaft of the engine. Such is shown in FIG. 2. In addition, if the take-off hydraulic system of the tractor was utilized, a hydraulically driven motor could be used as the means for rotating the blades of fan 70.

Now while it is obvious that the fluid utilized by propelling means 70 to push down upon plastic film 64 in FIG. 2 is air, it is also apparent that the fluid might also be a water spray or, a water and air mixture with the water introduced above fan 70 so that the mixture is forced against plastic film 64 to secure the film to the prepared bed and the oppositely situated furrows.

Figure 3:
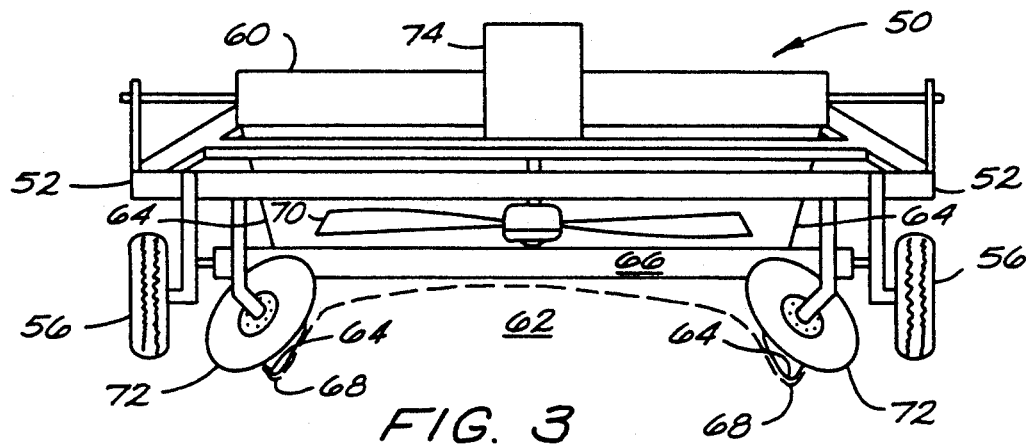
FIG. 3 is an end view of the preferred embodiment of the invention.

FIG. 3 is an end view of plastic film laying machine 50 wherein the means for rotating two fans 70 is shown, namely gasoline engine 74. Shown in FIG. 3 is the roll of plastic film 60 with plastic film 64 peeling off and covering seed bed 62. The fluid propelling means 70 is also shown together with furrow 68 formed by the opening discs 58 (not shown) and closing discs 72 which heap up soil onto the longitudinal side edges of plastic film 64. Lastly, rear wheels 56 are also shown.

Figure 4:
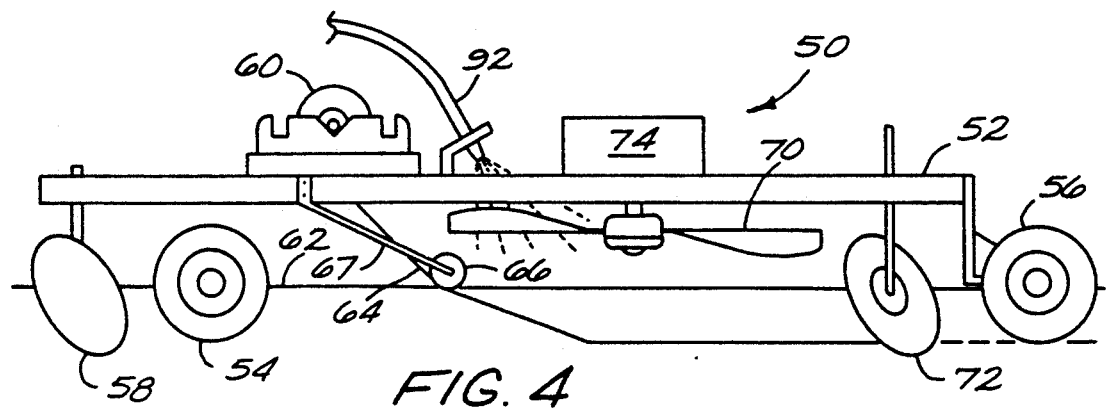
FIG. 4 is a side view of the preferred embodiment of the invention.

FIG. 4 is a side view of the preferred embodiment of inventive plastic film laying machine 50 more clearly showing the fluid propelling means, namely fan 70 directing air downward upon the plastic film 64 overlying the prepared seed bed 62 and furrow 68. Fan 70 is driven by gasoline engine 74. Weighted roller 66 shown in FIG. 4 is noted to be secured by pivotal arm 67 which allows roller 66 to move vertically up and down and thereby continually rest near the top of prepared seed bed 62, preliminarily holding plastic film 64 to bed 62 prior to receiving the blast of air from fan 70. Also shown in FIG. 4 is the roll of plastic film 60 secured to rectangular structural frame 52 to which all parts of the invention are attached. At the lead is opening disc 58 followed by forward wheels 54. To the rear is closing disc 72 followed by rear wheels 56. Immediately ahead of engine 74 is means to inject a fluid spray onto the plastic film, namely fluid injector 90, in order to provide an air-water mixture. Naturally, the position of one or more fluid injectors 90 may be varied in accordance with best results.

Figure 5:
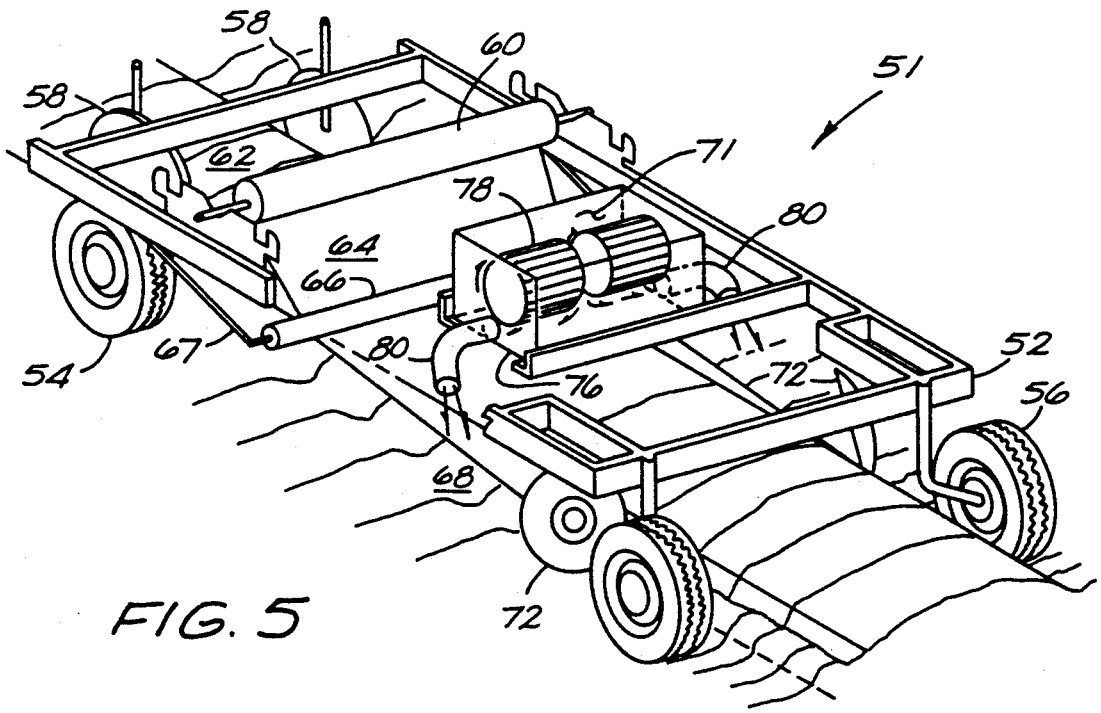
FIG. 5 is a perspective view of an alternate embodiment of the invention.

An alternate embodiment of the invention is shown in FIG. 5 where in perspective view a different type of fluid propelling means 71 is shown. Here, the fan type fluid propelling means has been exchanged for pump 71. Pump 71 may be either an air pump, such as a squirrel cage blower type 78, or may be a water or liquid pump. Fluid brought into housing 76 is forced out by the contained pumps through two outlets 80 whereupon the fluid is specifically directed at the inclined sides and bottom of furrow 68. By this means, plastic sheet 64, already placed down and held near to the top of seed bed 62 by weighted roller 66, is forced against the inclined sides and bottom of furrow 68 by air or water (or a mixture) emitted from outlet 80. Following the directed air or water upon the plastic film is closing disc 72 which piles up soil onto the longitudinal edges of plastic film 64 to anchor them there.

The fluid forced against the plastic film in the above invention may come in a continuous stream or may be in intermittent blasts.

It is apparent that the thick plastic film heretofore used in prior art plastic film laying machines to attempt to thwart the effects of disturbing winds may be replaced by a thinner and less expensive plastic film when utilizing the subject invention. Under both normal and abnormal conditions, higher speeds of operation may be obtained, eliminating an additional operator.

It is also apparent that the invention may be used in addition to the hold down wheels which appear on the prior art machines.

I claim:

1. An improvement to machines for laying agricultural plastic film of the type having a pair of front located openings discs to form furrows on opposite sides of an elongated seed bed, a roll of plastic film providing film for placement atop the seed bed and into the furrows, a weighted roller situated proximate the seed bed, the weighted roller receiving the film to lay the film upon the seed bed, and a pair of rear located closing discs located distal from the weighted roller throwing up soil upon the longitudinal side edges of the plastic film laying in the furrow to anchor the plastic film over the seed bed, the improvement comprising:

means forcing a fluid against the plastic film while the plastic film is laying atop the seed bed and in the spaced apart furrows to hold the longitudinal side edges of the plastic film in place against disturbing forces to permit the longitudinal side edges to be covered and secured with soil by the closing discs.

2. The improvement in plastic film laying machines as defined in claim 1 wherein said means forcing said fluid against the plastic film includes means to propel said fluid against the plastic film.

3. The improvement in plastic film laying machines as defined in claim 2 wherein said means propelling said fluid against the plastic film includes at least one fan positioned above the plastic film overlaying the seed bed and in the furrows to propel said fluid against the plastic film to hold it in place for its longitudinal side edges to be covered with soil.

4. The improvement in plastic film laying machines as defined in claim 3 wherein said means propelling said fluid against the plastic film includes a plurality of fans situated above the plastic film overlaying the seed bed and furrows.

5. The improvement in plastic film laying machines as defined in claim 2 wherein said means propelling said fluid defines pump means, said pump means pumping said fluid against the plastic film overlaying the seed bed and furrows.

6. The improvement in plastic film laying machines as defined in claim 5 wherein said pump means includes means to direct said fluid pumped by said pump, said fluid directing means selectively directing said fluid against the plastic film to hold it in place.

7. The improvement in plastic film laying machines as defined in claim 6 wherein said fluid directing means includes at least one fluid conducting duct with outlet.

8. The improvement in plastic film laying machines as defined in claim 7 wherein said means directing said fluid includes a plurality of fluid conducting ducts with outlets.

9. The improvement in plastic film laying machines as defined in claim 1 wherein said fluid defines air.

10. The improvement in plastic film laying machines as defined in claim 1 wherein said fluid defines a liquid.

11. The improvement in plastic film laying machines as defined in claim 1 wherein said fluid defines air and a liquid in a mixture.

12. The improvement in plastic film laying machines as defined in claim 1 wherein said fluid directed against the plastic film may be in intermittent blasts.

13. A method of holding plastic film in place atop an elongated seed bed and to the bottom of furrows on opposite sides of the seed bed against disturbing forces in order that the longitudinal side edges of the plastic film be covered by soil thrown up by closing discs to anchor the film in place, the method comprising the step of:

forcing a fluid against the plastic film while laying atop the seed bed and in the furrows to hold the plastic film in place while covering its longitudinal side edges with soil by the closing discs.

14. The method of holding plastic film onto a seed bed and in the furrows as defined in claim 13 wherein said step of forcing a fluid against the plastic film includes the step of propelling said fluid against the plastic film by at least one fan positioned above the plastic film overlaying the seed bed and furrows.

15. The method of holding plastic film onto a seed bed and in the furrows as defined in claim 14 wherein said step of forcing a fluid against the plastic film includes the step of propelling said fluid against the plastic film by a plurality of fans situated above the plastic film overlaying the seed bed and furrows.

16. The method of holding plastic film onto a seed bed and in the furrows as defined in claim 13 wherein said step of forcing a fluid against the plastic film includes the step of pumping said fluid against the plastic film overlaying the seed bed and furrows.

17. The method of holding plastic film onto a seed bed and in the furrows as defined in claim 16 wherein said step of pumping said fluid against the plastic film includes the step of directing said pumped fluid against the plastic film.

18. The method of holding plastic film onto a seed bed and in the furrows as defined in claim 17 wherein said step of directing said pumped fluid includes the step of directing said pumped fluid with fluid conducting ducts having outlets.

19. The method of holding plastic film onto a seed bed and in the furrows as defined in claim 14 wherein said step of propelling a fluid against the plastic film includes the step of propelling air against the plastic film.

20. The method of holding plastic film onto a seed bed and in the furrows as defined in claim 16 wherein said step of pumping said fluid against the plastic film includes the step of pumping air against the plastic film overlaying the seed bed and furrows.

21. The method of holding plastic film onto a seed bed and in the furrows as defined in claim 16 wherein said step of pumping said fluid against the plastic film overlaying the seed bed and furrows includes the step of pumping a liquid against the plastic film.

* * * * *